US005131362A

United States Patent [19]

Simon et al.

[11] Patent Number: 5,131,362

[45] Date of Patent: Jul. 21, 1992

[54] SAFETY DEVICE

[75] Inventors: Ewald Simon, Ludwigsburg; Detlev Zieger, Markgroeningen; Guenter Spiegel, Worms, all of Fed. Rep. of Germany

[73] Assignee: Robert Bosch GmbH, Stuttgart, Fed. Rep. of Germany

[21] Appl. No.: 658,820

[22] Filed: Feb. 22, 1991

[30] Foreign Application Priority Data

| | | | |
|---|---|---|---|
| Feb. 22, 1990 | [DE] | Fed. Rep. of Germany | 4005593 |
| Nov. 15, 1990 | [DE] | Fed. Rep. of Germany | 4036329 |

[51] Int. Cl.[5] .......... F02D 11/10; F16P 7/00; G05G 23/00

[52] U.S. Cl. .......... 123/396; 123/399; 318/565

[58] Field of Search .......... 123/396, 397, 399; 318/565

[56] References Cited

U.S. PATENT DOCUMENTS

| | | | |
|---|---|---|---|
| 4,519,360 | 5/1985 | Murakami | 123/399 |
| 4,612,615 | 9/1986 | Murakami | 123/399 |
| 4,896,640 | 1/1990 | Pfalzgraf et al. | 123/399 |
| 4,899,709 | 2/1990 | Aufmkolk | 123/399 |
| 4,953,529 | 9/1990 | Pfalzgraf et al. | 123/396 |
| 4,960,090 | 10/1990 | Muschalik et al. | 123/399 |
| 5,022,369 | 6/1991 | Terazawa | 123/399 |
| 5,048,484 | 9/1991 | Terazawa et al. | 123/396 |
| 5,060,613 | 10/1991 | Lieberoth-Leden et al. | 123/399 |

FOREIGN PATENT DOCUMENTS

| | | |
|---|---|---|
| 0358797 | 3/1988 | European Pat. Off. . |
| 3825793 | 2/1990 | Fed. Rep. of Germany . |
| 3901583 | 7/1990 | Fed. Rep. of Germany . |
| 3901585 | 7/1990 | Fed. Rep. of Germany . |

*Primary Examiner*—Andrew M. Dolinar

*Attorney, Agent, or Firm*—Edwin E. Greigg; Ronald E. Greigg

[57] ABSTRACT

In a known safety device, a relative position of an adjuster element with respect to a driver can be monitored, and a current path required for this purpose can be checked. To this end, two wipers must lift away from two wiper paths, depending on the position of the driver and adjuster element. Because of this liftoff, early wear of the wiper paths and considerable shifting of the switch point must be expected. In the safety device according to the invention, two switch lugs are provided on the adjuster element and a cam is provided on a base. This has the advantage above all of producing a safety device that is simple to manufacture and is durable. The safety device is especially suitable for power control systems for motor vehicles.

37 Claims, 6 Drawing Sheets

SAFETY DEVICE

BACKGROUND OF THE INVENTION

The invention is directed to an improved safety device for a power control on an engine.

In a known safety device for a power control system of a driving engine or motor, a driver and a control element are provided. In a normal operating state, the driver is actuated by an operating element and the control element is actuated by an actuator. To prevent the control element from assuming an unauthorized control position relative to the driver, the safety device is provided.

Three contact elements are provided on the control element. The first contact element is a wiper, which moves along a first contact path. The second contact element is also a wiper. The second contact element sweeps over a second contact path only in the idling range of the driving engine. In the partial-load range, the second contact element moves past the contact path; that is, it leaves the second contact path. For the third contact element, a third contact path is provided. The third contact path for the third contact element can be adjusted by a mimicking means in such a way that the third contact element touches the contact path only in the partial-load and full-load range. The third contact path for the third contact element in turn is put in contact with a regulating device, via a wiper that moves along a fourth contact path extending at angle. The third contact path for the third contact element is shorter than a free play between the control element and a clearance hook coupled to the driver.

The known safety device has several grave disadvantages. The second contact path for the second contact element does not extend over the entire length of possible motion of the associated second contact element. In other words, the second contact element sometimes travels over the contact path and sometimes is off it. No matter how thin the contact path for the second contact element is, there is still an at least small step at the beginning or end of the contact path. This step has to be overcome by the contact element. In long-term operation, this leads to damage of the second contact element. The step also wears over time, so that the beginning or end of the second contact path shifts over time, or in other words a state that cannot be defined precisely ensues. Furthermore, the third contact path for the third contact element must be pressed onto or lifted from the third contact element via a mimicking mechanism, which is not exactly simple to make. In pressing the third contact path onto the third contact element, or lifting it from it, increased friction arises between the clearance hook and a ramp incline carrying this hook. The action of pressing down and lifting off can also form sparks between the third contact element and the third contact path, which makes it likely that the service life of the third contact path will be shortened. Moreover, depending on the position of the control element relative to the driver, the third contact element also moves beyond the third contact path, so that damage and increased wear also occur at the end of the third contact path, between the third contact element and the contact path. For the above reasons in particular, accurate definition of the onset or end of contact between the second contact element and the second contact path and between the third contact element and the third contact path is not possible, so that in the course of the service life of the safety device, considerable shifting in the onset or end of contact with the contact paths must be expected.

OBJECT AND SUMMARY OF THE INVENTION

The safety device according to the invention, in particular for a power control system, has as its object the advantage that it is simple to make and durable.

If the switch lug comes to rest on the switching stop of the driver, then the first current path is preferentially opened. This signals the control electronics that the adjuster element is in a second control region relative to the driver. The first current path contains two contact points. A particularly advantageous feature is that the two contact points either rest mutually on one another or lift mutually away from on another; in other words, there is advantageously no friction whatever between the two contact points. Thus even over very long periods of operation of the safety device, there is advantageously virtually no change in the switching point of the first current path.

In a preselectable control position of the adjuster element relative to the base, one contact point of the switch lug comes into contact with one contact point of the cam. There is no mutual friction between these two contact points and thus advantageously virtually no wear. The control position in which the two contact points touch one another is advantageously simple and exact to define, preferably with the aid of a set screw; advantageously, this control position varies not at all, or virtually not at all, even over relatively long operation of the safety device.

Simultaneously or virtually simultaneously with opening or closure of the second current path via the cam, the first current path is opened or closed via the cam. The two switching points of the two current paths can thus advantageously be adjusted easily and simply via the cam and via prestressing of the switch lug; particularly since no friction occurs, the switching points advantageously vary virtually not at all.

If the cam is adjustable via a set screw, then the switching point can be adjusted simply and exactly, or varied as needed, advantageously via the closure or opening of the first and second current paths.

The invention will be better understood and further objects and advantages thereof will become more apparent from the ensuing detailed description of preferred embodiments taken in conjunction with the drawings.

DESCRIPTION OF THE PREFERRED EMBODIMENTS

The design and operation of a safety device embodiment according to the invention for a power control system in a machine, in particular in a vehicle, having a final control element the control position of which determines the power of a driving engine, will now be described in further detail in terms of several exemplary embodiments, referring to FIGS. 1-7.

Figure 1:
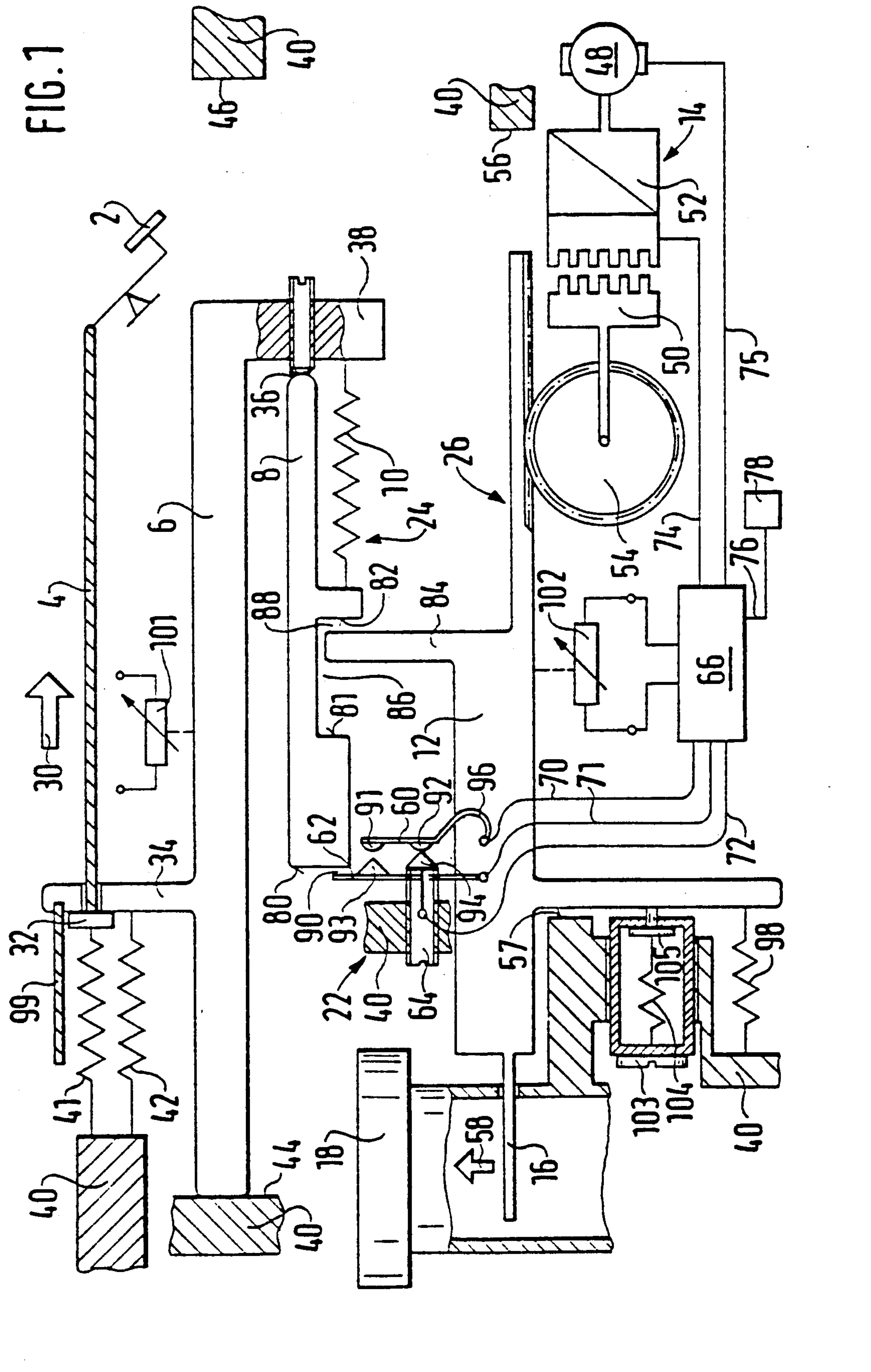
FIGS. 1-5 each show one exemplary embodiment of a safety device according to the invention, in simplified form.

FIG. 1 shows the first exemplary embodiment. The power control system having the safety device according to the invention substantially includes an operating element 2, a first transmission element 4, a second transmission element 6, a driver 8, a coupling spring 10, an adjusting element 12, an actuator 14, a final control element 16 and the safety device 22 of the invention, for controlling a driving engine 18.

The transmission elements 4, 6, the coupling spring 10 and the driver 8 form a set-point group 24. The adjuster element 12 and the final control element 16 form an actual-value group 26.

An arrow 30 is shown in the drawing. The direction of motion of the transmission elements 4, 6, the driver 8, the adjuster element 12 and the final control element 16 is parallel to the direction of arrow 30. An actuation of the final control element 16 in the direction of the direction of arrow 30 represents an increase in power of the driving engine; the opposite direction represents a decrease in power.

Upon actuation of the first transmission element 4 by the operating element 2 in the direction of the direction of arrow 30, an enlarged portion 32 of the first transmission element 4 rests on a first lever 34 of the second transmission element 6. The coupling spring 10 acts on the one hand on the driver 8 and on the other on the second transmission element 6, in the effort to actuate one end 36 of the driver 8 toward a second lever 38 of the second transmission element 6.

The drawing shows several details of a base 40. The base 40 symbolizes a part inside the machine that can be considered immovable. The base 40 may for instance be part of the housing of the power control system. A first restoring spring 41 and a second restoring spring 42 each act by one end on the base 40. The first restoring spring 41 acts by its other end upon the first transmission element 4 with the tendency of actuating the transmission element 4 counter to the direction of arrow 30. The second restoring spring 42 acts with its other end on the second transmission element 6, with the tendency of actuating the second transmission element 6 counter to the direction of arrow 30. If the operating element 2 is not actuated, the second transmission element 6 is actuated counter to the direction of arrow 30, until the second transmission element 6 comes to rest on a left-hand stop 44 of the base 40. Via the operating element 2, the second transmission element 6 can be actuated in the direction of arrow 30, until the second transmission element 6 comes to rest on a right-hand stop 46 of the base 40. Because of the coupling spring 10, the driver 8, except for special cases, moves in the same direction as the second transmission element 6 and thus its motion is dependent on the operating element 2.

The actuator 14 includes a servomotor 48, an electrically actuatable clutch 50, a gear 52 and a drive pinion 54.

The final control element 16 is connected to the adjuster element 12. The drive pinion 54 of the actuator 14 acts upon the adjuster element 12. Via the actuator 14, the adjuster element 12 can be actuated in both directions. The actuator 14 can actuate the adjuster element 12 in the direction of the direction of arrow 30 until the adjuster element 12 rests on a further stop 56 of the base. Since an actuation of the adjuster element 12 in the direction of the direction of arrow 30 represents an increase in power of the driving engine 18, an unintended actuation of the adjuster element 12 in the direction of the direction of arrow 30 must be prevented with the maximum possible certainty. An adjustment of the adjuster element 12 by the actuator 14 counter to the direction of arrow 30 is possible until the adjuster element 12 rests on a stop 57 of the base 40.

If by way of example the driving engine 18 is an internal combustion engine with externally supplied ignition, then the final control element 16 is for instance a throttle valve, and a flow 58 toward the driving engine 18 can be varied via the final control element 16. The flow 58 is represented in the drawing by an arrow 58. However, the driving engine 18 may also be a Diesel engine, for example. In that case, the final control element 16 is a governor rod for an injection pump for a Diesel engine, for example. However, it is also possible for the driving engine 18 to be an electric motor; in that case, the final control element 16 would for instance be a voltage control device.

In the first exemplary embodiment of FIG. 1, the safety device 22 substantially includes a switch lug 60, a second switch lug 62, a cam 64, control electronics 66, a first electric line 70 between the switch lug 60 and the control electronics 66, a second electric line 71 between the second switch lug 62 and the control electronics 66, a third electric line 72 between the cam 64 and the control electronics 66, a fourth electric line 74 between the control electronics 66 and the clutch 50, a fifth electric line 75 between the control electronics 66 and the servomotor 48, and a sixth electric line 76 between the control electronics 66 and an energy supply 78. Depending on what is connected, each of the lines 70, 71, 72, 74, 75, 76 comprises one or more electric conductors insulated from one another.

On the driver side of the set-point group 24 there are a switching stop 80, a first stop face 81 and a second stop face 82. A stop 84 is provided on the adjuster element 12. The adjuster element 12 is freely movable to a limited extent relative to the driver 8. The first stop face 81 limits the mobility of the adjuster element 12 relative to the driver 8 counter to the direction of arrow 30, and the second stop face 82 of the driver 8 limits the mobility of the adjuster element 12 in the direction of the direction of arrow 30. In other words, depending on the direction of motion of the adjuster element 12, the stop 84 of the adjuster element 12 can come to rest on either the first stop face 81 of the driver 8 or the second stop face 82 of the driver 8. A first clearance 86 exists between the first stop face 81 of the driver 8 and the stop 84 of the adjuster element 12, and a more or less large second clearance 88 exists between the stop 84 of the adjuster element 12 and the second stop face 82 of the driver 8.

As is known for switching tongues, for instance for relays, the second switch lug 62 of the safety device 22 is in the form of a leaf spring and is connected by one end, at least indirectly, to the adjuster element 12. If the adjuster element 12 is in a first control region relative to the driver 8, then a more or less large switching distance 90 exists between the second switch lug 62 and the switching stop 80 of the driver 8. Similarly to the second switch lug 62, the switch lug 60 is in the form of a leaf spring, has a first contact point 91 and a second contact point 92, and is likewise firmly connected, at least indirectly, by one end to the adjuster element 12. "At least indirectly" means that the switch lugs 60, 62 may also be connected to the adjuster element 12 indirectly via further components, not shown in FIG. 1. The switch lugs 60, 62 can also be connected to some other component of the actual-value group 26. The second switch lug 62 is provided with a third contact point 93. One end of the cam 64 points in the direction of the switch lug 60. This end of the cam 64 forms a fourth contact point 94. Depending on the position of the adjuster element 12, the first contact point 91 can come in contact with the third contact point 93 of the second switch lug 62, and the second contact point 92 of the switch lug 60 can come into contact with the fourth contact point 94 of the cam 64. The switch lug 60 and the second switch lug 62 are disposed on the adjuster element 12 such that when the adjuster element 12 is positioned within the first relative control range, the first contact point 91 touches the third contact point 93, as long as the fourth contact point 94 of the cam 64 is not resting on the second contact point 92 of the switch lug 60. If the adjuster element 12 is actuated relative to the driver 8 in the direction of the direction of arrow 30 then the distance pistons 90 between the second switch lug 62 and the switch stop 80 of the driver 8 initially decreases. Upon further motion of the adjuster element 12 in the direction of the direction of arrow 30, the end remote from the adjuster element 12 of the second switch lug 62 first touches the switch stop 80 of the driver 8, and the second switch lug 62 is bent somewhat, so that the third contact point 93 of the second switch lug 62 lifts away from the first contact point 91 of the switch lug 60. The switching distance 90 is less than the second clearance 88, so that in every case the second switch lug 62 comes to rest on the switch stop 80 and the two contact points 91, 93 lift away from each other before the adjuster element 12 comes into contact, by its stop 84, with the second stop face 82. If the adjuster element 12 is displaced counter to the direction of arrow 30, then the second contact point 92 of the switch lug 60 can come to rest on the fourth contact point 94 of the cam 64. If the adjuster element 12 is moved beyond that point counter to the direction of arrow 30, then the switch lug 60 is bent by the cam 64, in such a way that the first contact point 91 of the switch lug 60 lifts away from the third contact point 93 of the second switch lug 62. In the exemplary embodiment of FIG. 1, this happens as a result of bending of the switch lug 60 in the clockwise direction around the fastening point on the adjuster element 12. To allow bending the switch lugs 60, 62 without danger, the switch lug 60 and the second switch lug 62 can be provided with a curved part 96 between the corresponding fastening point and the corresponding contact points 91 or 92 or 93. In the exemplary embodiment of FIG. 1 shown, the curved part 96 is provided on the switch lug 60 between the contact point 92 and the fastening point of the switch lug 60.

The first line 70 connects the control electronics 66 to the contact points 91, 92. The contact points 91, 92 could instead be connected to the control electronics 66 each by a separate line. The lines 71 and 72, respectively, connect the contact points 93 and 9 to the control electronics 66. Beginning at the control electronics 66, a first current path extends through the first line 70, switch lug 60, first contact point 91, third contact point 93 and second line 71 and returns to the control electronics 66. A second current path begins at the control electronics 66 and passes via the first line 70, the contact point 92, the contact point 94, the cam 64, and the third line 72 to return to the control electronics 66. Depending on the position of the adjuster element 12 relative to the driver 8, the first current path and/or the second current path is opened or closed.

With the aid of the safety device according to the invention, a relative control range occupied by the adjuster element 12 relative to the driver 8 can in particular be ascertained. A distinction can be made between two relative control ranges of the adjuster element 12 with respect to the driver 8. In the first relative control range, there is usually an at least slight switching distance 90 between the second switch lug 62 and the switch stop 80 of the driver 8. In the first relative control range, the first current path is closed, as long as the switch lug 60 does not touch the cam 64. In the second relative control rang of the adjuster element 12 with respect to the driver 8, the adjuster element 12 is moved so far in the direction of the direction of arrow 30 that the third contact point 93 has lifted away from the first contact point 91, via the switch stop 80 of the driver 8. If the adjuster element 12 is actuated so far counter to the direction of arrow 30 that the contact point 92 rests on the contact point 94 of the cam, then the first current path is opened and the second current path is closed. In the exemplary embodiment shown, this corresponds to the idling range of the driving engine 18.

If the first current path is closed and the second current path is opened, then the control electronics 66 know, from a circuit or program entered into them, that the adjuster element 12 is in the first relative control region with respect to the driver 8; which in the exemplary embodiment shown is equivalent to a normal operating state of the power control system. If the first current path and the second current path are opened, then the control electronics 66 recognize that the adjuster element 12 is in the second relative control range relative to the driver 8. In the power control system shown by way of example, the second relative control range is equivalent to an unauthorized operating state, which must be avoided under all circumstances. If this unauthorized operating state occurs, then the control electronics 66 can trigger the servomotor 48 of the actuator 14 such that the actuator 14 adjusts the adjuster element 12 at least far enough counter to the direction of arrow 30 that the normal operating state is resumed. The control electronics 66 may also, however, preferably withdraw power from the clutch 50, so that a spring disposed in the clutch 50 disconnects the pinion 54 from the servomotor 48, enabling a restoring spring 98 engaging the base 40 and the adjuster element 12 to actuate the adjuster element 12 counter to the direction of arrow 30, at least until the normal operating state is resumed. As needed, the control electronics 66 can decouple the servomotor 48 via the clutch 50 only temporarily, or until such time as some defect present at some point has been eliminated. The actuator 14 is designed such that the adjuster element 12 normally never enters the second relative range relative to the driver 8, so that the power control system normally never enters the unauthorized operating state. However, in that case the first current path extending via the two contact points 91, 93, without the cam 64, would normally always be closed, and thus there would be no opportunity of checking whether the first current path would actually indicate the unauthorized operating state, which state might never occur.

If the second current path is closed and the first current path is opened, then the control electronics 66 can recognize that the adjuster element 12 is actuated counter to the direction of arrow 30, which in the exemplary embodiment shown is equivalent to minimum power of the driving engine 18. This is likewise an authorized operating state.

If the first current path and the second current path are closed, then from the program provided, the control electronics 66 know that the state, aside from a very brief transition phase, should actually never be allowed to occur and that the danger exists that some defect is present in the course of the first current path, because of which defect a shift of the adjuster element 12 into the second relative control region relative to the driver 8 can no longer be recognized. In that case it is practical or necessary to shut off the servomotor 48 and/or the clutch 50. The final control element 16 can then be actuated only purely mechanically by the operating element 2, which prevents operation of the power control system in an unauthorized operating state in the event of a defect in the course of the first current path.

In the case of electromechanical shifting of the final control element 16, a set-point transducer 101 ascertains a set point specified by the operating element 2, and an electrical actual-value transducer 102 ascertains the control position of the adjuster element 12 or final control element 16. The actuator 14 shifts the adjuster element 12 far enough that the control position of the adjuster element 12 ascertained via the actual-value transducer 102 corresponds to the set-point position ascertained via the set-point transducer 101; other set-point transducers and/or sensors, not shown, may also have an influence on the set point. Because of the two clearances 86, 88 between the adjuster element 12 and the driver 8, the shifting of the adjuster element 12 by the actuator 14 normally occurs without contact between the adjuster element 12 and the driver 8. The clearances 86, 88 may be selected to be so large that the stop 84 of the adjuster element 12 does not come to rest on the stop faces 81, 82 of the driver 8 even in the event that the transmission characteristic curve is progressive, regressive or otherwise curved.

If the driving engine 18 is governed automatically, the logic of the safety device 22 can be bypassed, so that the adjuster element 12 can be actuated in the direction of the direction of arrow 30 independently of the safety device 22. Upon shutoff of the automatic governing of the driving engine 18, for example by actuation of a brake, the safety device 22 is immediately put out of operation. The stop face 82 on the driver 8 along with the stop 84 of the adjuster element 12 prevents excessive bending of the second switch lug 62 in automatic governing of the driving engine 18. For this reason, the clearance 88 between the adjuster element 12 and the driver 8 is not very much greater than the switching distance 90 between the second switch lug 62 and the switch stop 80 of the driver 8. In automatic governing operation, the driver 8 and thus the transmission element 6 and a further transmission element 99 connected to the transmission element 6 are moved in the direction of the direction of arrow 30 by the adjuster element 12.

Another additional option for testing plausibility is for the set-point transducer 101 and/or the actual-value transducer 102 likewise to be connected to the control electronics 66 of the safety device 22. Then, the values ascertained via the set-point transducer 101 and the actual-value transducer 102 can be compared with the switching state of the first current path and/or with the switching state of the second current path.

An idling stop 103 is also provided on the base 40. The cam 64 is adjustable parallel to the direction of arrow 30. It is practical to set the cam 64 in such a way that whenever the adjuster element 12 rests on the idling stop 103, the second current path is closed. However, the cam 64 may also be set such that the second current path is closed before the adjuster element 12 touches the idling stop 103, so that the second current path will be closed and the first current path will be opened in every case when the operating element 2 is not actuated, such as for purposes of checking the first current path, even in a warmup phase of the driving engine 18. Because of a spring 104 and a displaceable bolt 105 inside the idling stop 103, the adjuster element 12 can also be shifted counter to the direction of arrow 30 with the aid of the actuator 14 even after it contacts the idling stop 103, but no farther than to the stop 57. This precludes excessive deformation of the switch lug 60, among other effects.

Figure 2:
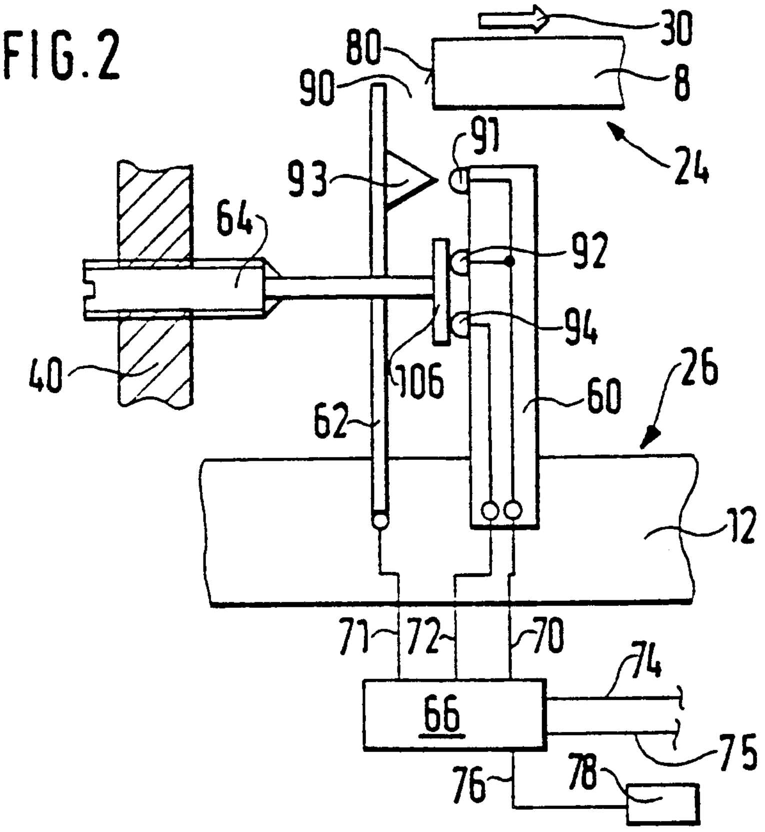

FIG. 2 shows the second exemplary embodiment. In all the drawing figures, elements that are the same or function the same are provided with the same reference numerals. FIG. 2 shows only details of the power control system.

In the second exemplary embodiment of FIG. 2, the fourth contact point 94 is also disposed on the switch lug 60. If the switch lug 60 in the second exemplary embodiment comes to contact the cam 64 upon actuation of the adjuster element 12 counter to the direction of arrow 30, then the two contact points 92, 94 are electrically connected, with the aid of a bridge element 106 provided on the cam 64. Once again, upon actuation of the adjuster element 12 counter to the direction of arrow 30 and thus to the cam 64, the switch lug 60 is bent, and the contact point 91 of the switch lug 60 lifts away from the third contact point 93 of the second switch lug 62.

Figure 3:
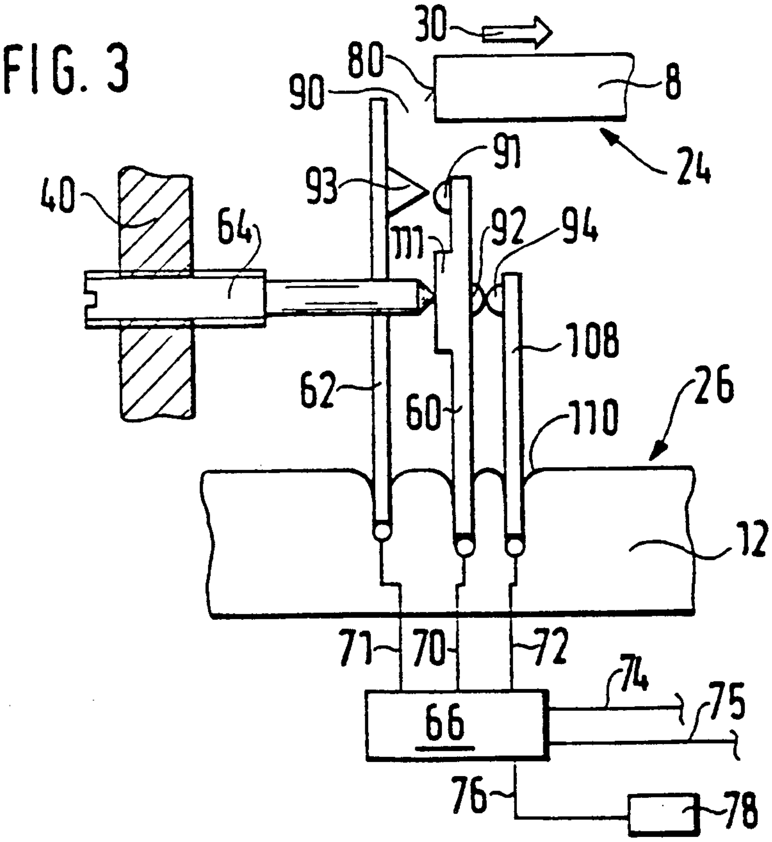

FIG. 3 shows the third exemplary embodiment. Once again, only details of the power control system are shown. In the third exemplary embodiment, a third switch lug 108 is also disposed on the adjuster element 12. Like the switch lug 60 and the second switch lug 62, the third switch lug 108 is firmly fastened by one end to the adjuster element 12. It is favorable for the durability of the switch lugs 60, 62, 108 if wherever the switch lugs are fastened to the adjuster element 12, rounded portions 110 are provided. The rounded portions 10 prevent kinking of the switch lugs 60, 62, 108 in the region of their fastening points.

In the third exemplary embodiment the fourth contact point 94 is disposed on the third switch lug 108. A bearing face 111 is also provided on the switch lug 60. Here, upon actuation of the adjuster element 12 counter to the direction of arrow 30, upon contact of the bearing face 111 with the cam 64, the switch lug 60 is bent to the right, causing the first contact point 91 to lift away from the third contact point 93 and causing the second contact point 92 to touch the fourth contact point 94. In the third exemplary embodiment, the second current path does not, as in the first exemplary embodiment, extend via the cam 64 but rather via the third switch lug 108.

Figure 4:
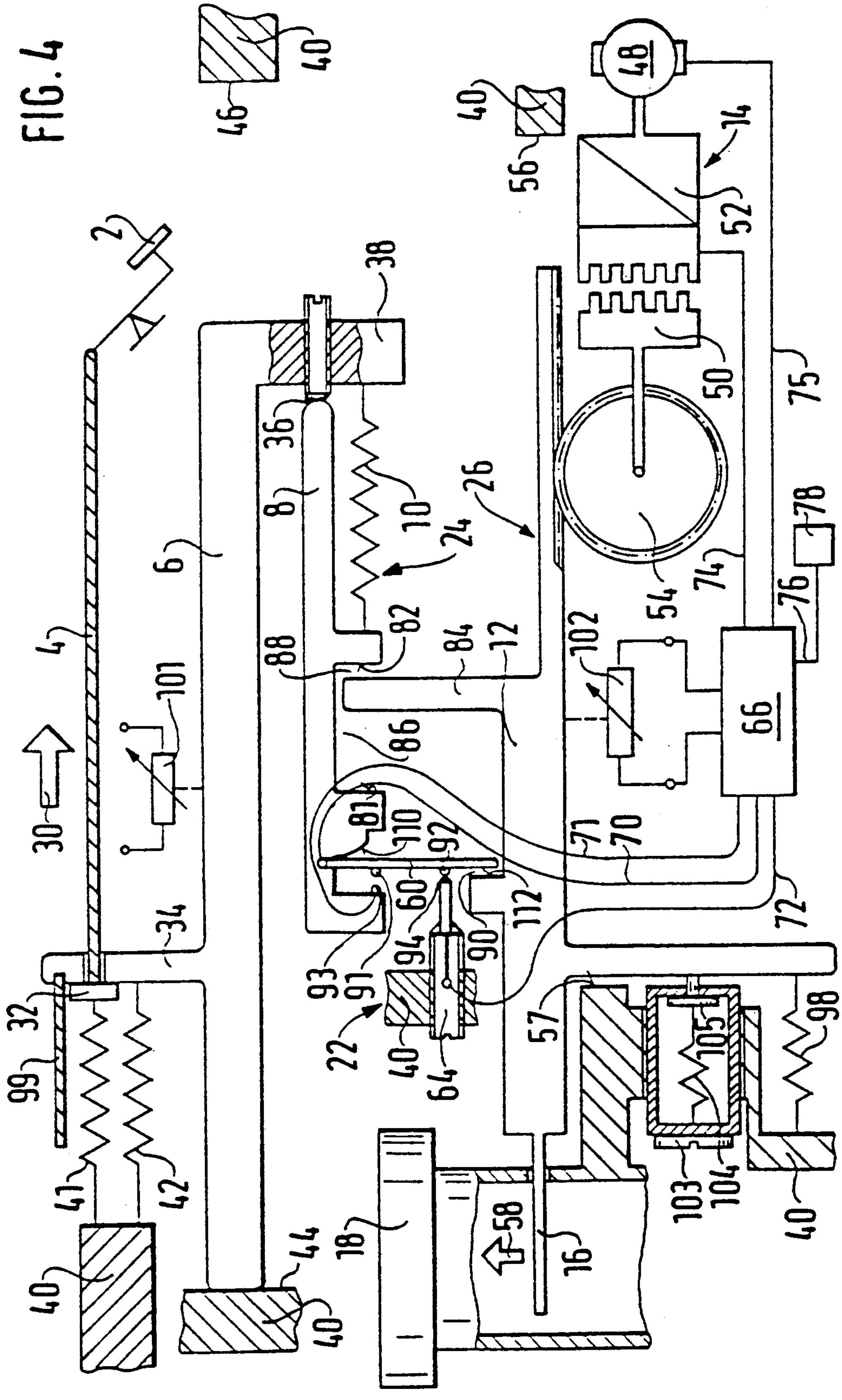

FIG. 4 shows the fourth exemplary embodiment. In the fourth exemplary embodiment, the switch lug 60 is disposed not on the adjuster element 12 but instead at least indirectly on the driver 8. The switch lug 60 may instead be connected to some other component of the set-point group 24. As compared with the exemplary embodiments of FIGS. 1-3, the switch stop 80 of the driver 8 is omitted in FIG. 4. Instead of the switch stop 80, a switch stop 112 is provided on the adjuster element 12. The switching distance 90 in this exemplary embodiment extends between the switch stop 112 of the adjuster element 12 and the unfastened end of the switch lug 60. The third contact point 93 is disposed on the driver 8. If the driver 8 is actuated at least somewhat in the direction of the direction of arrow 30, then as long as the adjuster element !2 is in the first relative control region with respect to the driver 8, the first current path is closed via the line 70, the first contact point 91, the third contact point 93 and the line 71. If the adjuster element 12 is actuated too far in the direction of the direction of arrow 30 relative to the driver 8, then the switch lug 60 comes to rest by its non-fastened end on the switch stop 112 of the adjuster element 12. Upon further actuation of the adjuster element 12 in the direction of the direction of arrow 30, the first contact point 91 of the switch lug 60 lifts away from the third contact point 93 of the driver 8, and the control electronics 66 can recognize that the adjuster element 12 is in the second relative control range with respect to the driver 8, or in other words that a defect is present. To assure safe switching, the safe switch distance 90 between the switch lug 60 and the switch stop 112 of the adjuster element 12 is once again shorter than the second clearance 88 between the stop face 82 of the driver 8 and the stop 84 of the adjuster element 12.

If the driver 8 is actuated counter to the direction of arrow 30, in other words if the operating element 2 is released, then the second contact point 92 of the switch lug 60 can be actuated toward the fourth contact point 94 of the cam 64, whereupon the switch lug 60 in FIG. 4 is bent counterclockwise, causing the first contact point 91 of the switch lug 60 to lift away from the third contact point 93 of the driver 8. The second current path is thereby closed and the first current path opened. As a result, the control electronics 66 can once again recognize that the first current path can open as intended, for monitoring the relative position of the adjuster element 12 with respect to the driver 8, and that the adjuster element 12 is in the range of low power of the driving engine 18. If while the operating element 2 is not actuated, the adjuster element 12 is incorrectly actuated via the actuator 14 too far in the direction of the direction of arrow 30, then via the stop 84 and the stop face 82, the driver 8 is actuated by the adjuster element 12 in the direction of the direction of arrow 30, thereupon interrupting the second current path. Since the second clearance 88 is longer than the switching distance 90, however, the first current path remains unbroken and the control electronics 66 can recognize the defective operation.

As a comparison of FIG. 4 with FIGS. 1-3 shows, the at least one switch lug 60, 62 may be disposed either on the set-point group 24, that is, on the driver 8, or on the actual-value group 26, that is, on the adjuster element 12. The fourth exemplary embodiment shown in FIG. 4 has the advantage over the exemplary embodiments of FIGS. 1-3 that only switch lug 60 is required. Once again, to avoid excessive bending strains in the switch lug 60 and to provide for a long service life of the switch lug 60, the rounded portion 110 is provided in the vicinity of the fastening point of the switch lug 60.

Figure 5:
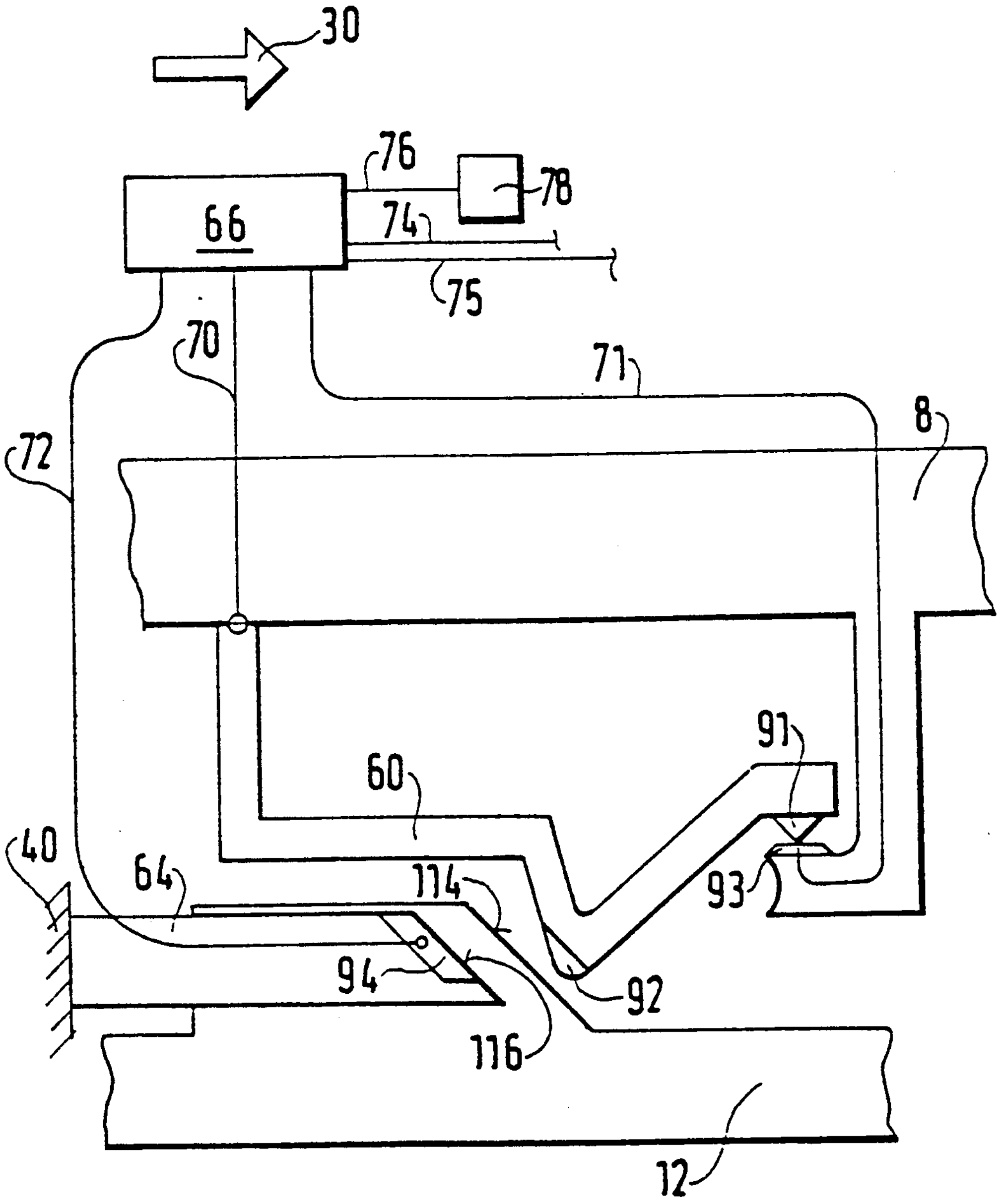

FIG. 5 shows the fifth exemplary embodiment. In the fifth exemplary embodiment, as in the fourth exemplary embodiment shown in FIG. 4, the switch lug 60 is connected to the driver 8. A liftoff incline 114 is provided on the adjuster element 12, and a liftoff incline 116 is provided on the cam 64. In the fifth exemplary embodiment, if the adjuster element 12 enters the second relative control range with respect to the driver 8, then the switch lug 60 is deflected by the liftoff incline 114 of the adjuster element 12, causing the first contact point 91 disposed on the switch lug 60 to lift away from the third contact point 93 disposed on the driver 8. Once again, whenever the adjuster element 12 is in the second relative control range with respect to the driver 8, the first current path is opened. Upon actuation of the driver 8 counter to the direction of arrow 30, the switch lug 60 can come into contact with the cam 64, finally causing deflection of the switch lug 60 of the driver 8 with the aid of the liftoff incline 116 of the cam 64, so that the first current path extending via the two contact points 91, 93 is broken. Via the second contact point 92 of the switch lug 60 and via the fourth contact point 94 of the cam 64, the second current path can be closed and the first current path opened, given sufficient actuation of the driver 8 counter to the direction of arrow 30. This last switch state arises while the driving engine 18 is operated in the idling range.

Depending on the application of the safety device, it is particularly favorable if upon actuation of the adjuster element 12 or of the driver 8 counter to the direction of arrow 30, the second current path is closed first, and the first current path is opened only shortly thereafter. In special cases, however, it may be favorable for the first current path to be opened first and then the second current path to be closed subsequently. Depending upon how strongly the various contact points are prestressed against the respective other associated contact point, with the aid of the respective switch lugs 60, 62 or 60, 62, 108, the desired switching sequence is attained. Depending on the desired switching sequence, one or the other of the exemplary embodiments 1-5 will be particularly advantageous.

For reasons of tolerance, it is not possible in large-scale mass production for one current path to open and the other current path to close precisely simultaneously every time. If the operating element 2 is kept in a constant position for a relatively long time, for instance, this could cause an incorrect interpretation by the control electronics 66, if both current paths are for instance closed during that period. In this situation to prevent incorrect interpretation by the control electronics 66, several advantageous remedies are possible: Since the state described here generally can occur for at most a brief period, and only within a narrowly defined control position, a delay can be built into the control electronics 66, as an example. Alternatively, the control electronics 66 may for instance be embodied such that the actuator 14 is switched off only once both current paths have been closed for longer than a predetermined period of time, and/or the control electronics 66 can be switched in such a way that the actuator 14 is switched off only if both current paths have opened or closed simultaneously, either once or several times in succession. A further remedy could for instance be to provide that evaluation of the safety device is not performed within a certain control range of the adjuster element 12, in which it may for instance happen that both current paths are closed even if there is no defect. This control range for instance corresponds to the upper idling range or the lower partial-load range of the driving engine 18. In other words, checking of the two current paths is effected only if the adjuster element 12 is located outside either side of this bracketed control range. This control range may for instance be detected with the aid of the actual-value transducer 102. Still another remedy is for instance to provide that the two current paths are checked for plausibility only while the driving engine 18 is operating in the so-called overrunning mode.

Even if the operating element 2 is released very quickly, it may happen that during the time that the driver 8 is moving counter to the direction of arrow 30, the adjuster element 12 driven by the actuator 14 is unable to follow the fast motion of the driver 8 quickly enough. Once again, it may happen then that both current paths are briefly opened even though there is no defect. To preclude incorrect interpretation by the control electronics 66 in this case, it may be specified to the control electronics 66 that a safety check is not performed in the event of fast motions of the driver 8 or of operating element 2 counter to the direction of arrow 30. The direction of motion and speed of the driver 8 can be detected for instance with the aid of the set-point transducer 101.

Since each of the contact points 91, 92, 93, 94 are adjustable in a direction parallel to that of the arrow, for instance with the aid of a set screw, the state in which both current paths are closed during normal functioning can be limited to a minimum. In the drawing, the contact point 94 on the cam is shown as adjustable, for example. If needed, however, the contact points 91, 92, 93 can equally be adjustable. The fastening point of the switch lugs 60, 62, 108 can also be shiftable parallel to the direction of arrow 30 on the adjuster element 12 or on the driver 8. For the sake of clarity in the drawing, no attempt was made to show a shiftable fastening point.

The safety device according to the invention has been described in conjunction with exemplary embodiments in which the driver 8 and the adjuster element 12 can execute a rectilinear motion parallel to the direction of arrow 30. It is equally possible, and more favorable in many applications, to support the components described here rotatably on pivot shafts, and then it is particularly practical if all the shafts are aligned in a single line. The driver 8 and the adjuster element 12 then do not execute reciprocating motions parallel to the direction of arrow 30 but instead execute variably major swiveling motions about the pivot shaft. A control motion in the direction of the direction of arrow 30 in that case means a swiveling motion in one rotational direction, and counter to the direction of arrow 30 means a swiveling motion in the opposite direction. All the components may be embodied as more or less round or curved.

Final control element 16 may for instance be a pivotably supported throttle valve. It is therefore practical to make the adjuster element 12 and the driver 8 pivotable as well.

The safety device according to the invention has been described by way of example in an application within a power control system of a machine having a driving engine 18. The machine may for instance be a stationary-mounted machine, or a vehicle.

The safety device 22 according to the invention can be used not only in power control systems but wherever a relative control position of one component (adjuster element 12) relative to some other component (driver 8) is to be monitored. In other words, the safety device according to the invention is usable not only for power control systems but in other applications as well.

The connection of the switch lugs 60, 62, 108 to the adjuster element 12 or driver 8 is merely exemplary. To achieve the same action, the switch lugs 60, 62, 108 could for instance be connected to the final control element 16 on the one hand and on the other to the transmission element 6 or the transmission element 4, the transmission element 99 or the operating element 2. The switch lugs 60, 62, 108 can also be disposed on separate switch lug carriers, which are connected in turn to the driver 8 or adjuster element 12.

A particular advantage of the safety device according to the invention is that the current paths can be opened and closed between contact points 91, 92, 93, 94 that are simple to manufacture. At no time does a contact point lift away from a contact path or wiper path or resistor path. For producing the contact points 91, 92, 93, 94 and the switch lugs 60, 62, 108, numerous manufacturing techniques are known in other technical fields, for instance the production of switch relays. It is therefore advantageously possible to expect very high reliability and durability, in particular, for the safety device according to the invention.

In the exemplary embodiments of FIG. 1-5 described, the second current path is closed and the first current path is opened once the adjuster element 12 with the switch lug 60 is actuated counter to the direction of arrow 30 toward the cam 64. Moreover, once the adjuster element 12 is in the second relative control range with respect to the driver 8, the first current path is opened, and in the first relative control range the first current path is closed. This is merely by way of example. For one or the other of the current paths, or both, closing of the current path may if needed be replaced with its opening, in a structurally arbitrary way.

The lines 70, 71, 72 can be structurally arbitrarily embodied and laid. The lines 70, 71, 72 may for instance be flexible lines or current carrying tracks. The safety device 22 according to the invention can also recognize a defect in the course of the lines 70, 71, 72.

Each time the adjuster element 12 is actuated counter to the direction of arrow 30, or in other words whenever the driving engine 18 is idling, the first current path is checked. This has the advantage that no separate active test run is needed to check the first current path.

In FIGS. 1 and 4, the adjuster element 12 of the actual-value group 26 ca be adjusted either electromechanically or purely mechanically. As needed, the coupling spring 10 may be dispensed with, and the driver 8, second transmission element 6 and optionally the first transmission element 4 may be firmly joined together or be in one piece. If the adjuster element 12 is to be electromechanically adjustable, and if it is possible to dispense with purely mechanical adjustment of the adjuster element 12 or in other words of the actual-value group 26, then the stop faces 81, 82 on the set-point group 24 and the stop 84 on the actual-value group 26 may be omitted.

In the exemplary embodiment shown in FIG. 1, the switch stop 80 may also be provided on some other component of the set-point group 24, such as on the second transmission element 6 or first transmission element 4. In the exemplary embodiment shown in FIG. 4, the switch stop 112 may be disposed on any component of the actual-value group 26.

Figure 6:
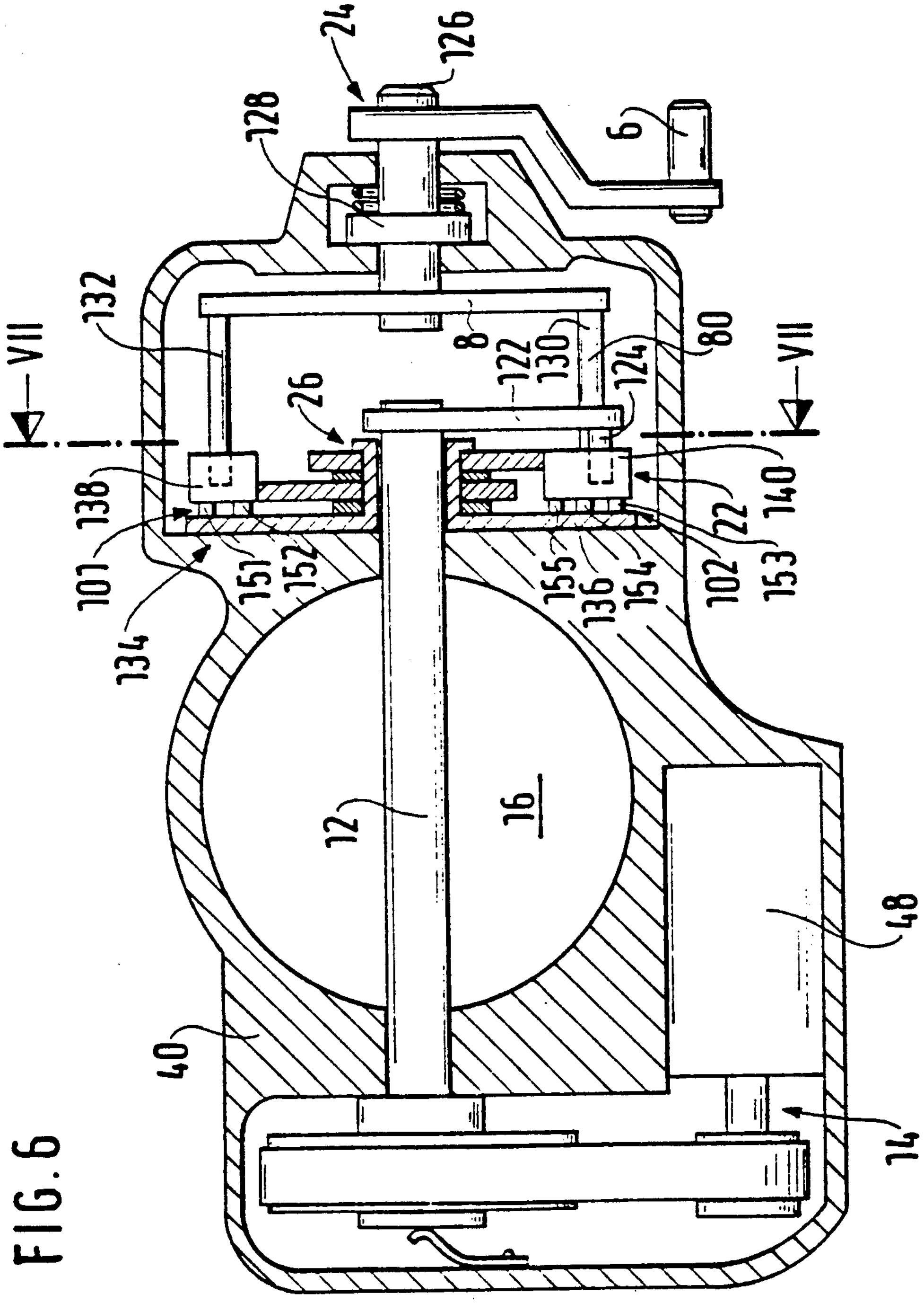
FIGS. 6 and 7 show a particularly advantageous three-dimensional arrangement of the safety device.

FIG. 6 shows a particularly advantageous three-dimensional arrangement of the safety device, as an exemplary embodiment.

The actual-value group 24 in FIG. 6 includes the final control element 16, the adjuster element 12, a pivot arm 122 and a pivot 124. The final control element 16 is by way of example a throttle valve, and the adjuster element 12 is a throttle valve shaft. These parts are joined firmly to one another. The set-point group 24 includes the transmission element 6, a shaft 126 with a step 128, the driver 8, a pivot 130 and a pivot 132. The parts mentioned in this last sentence are firmly joined together. In FIG. 6, the base 40 is a housing of a power control system of an internal combustion engine. A rotational angle sensor 134 is disposed on the base 40. The rotational angle sensor 134 includes a substrate material 136, a first rotary element 138, and a second rotary element 140. Wiper paths are provided on the substrate material 136, oriented toward the rotary elements 138, 140.

Figure 7:
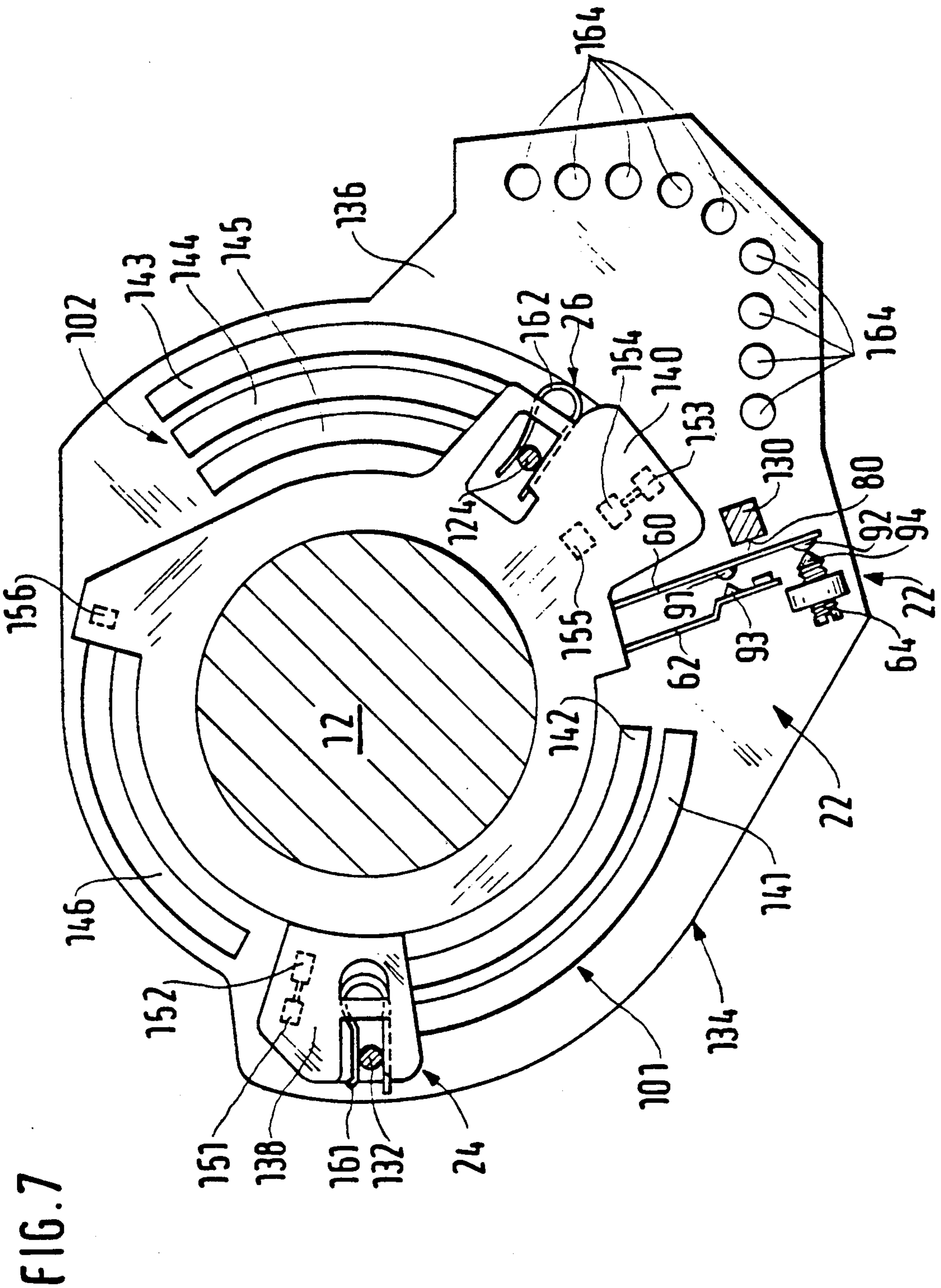

For the sake of clarity, a section along the line VII—VII of FIG. 6 is shown in FIG. 7. FIG. 7 is a vertical view, not to scale, on the substrate material 136 and rotary elements 138, 140 transversely to the adjuster element 12.

A first wiper path 141, a second wiper path 142, a third wiper path 143, a fourth wiper path 144, a fifth wiper path 145, and a sixth wiper path 146 are provided on the substrate material 136. Located on the first rotary element 138 are a first wiper 151 and a second wiper 152. Located on the second rotary element 140 are a third wiper 153, a fourth wiper 154, a fifth wiper 155 and a sixth wiper 156. The wipers 151, 152, 153, 154, 155, 156 are disposed on the side of the rotary elements 138, 140 that cannot be seen in FIG. 7 and are therefore shown in dashed lines in FIG. 7. The first wiper 151 has contact with the first wiper path 141, and so forth, through to the last, the sixth wiper 156, which establishes contact with the sixth wiper path 146. The wiper 151 is connected to the wiper 152, or the wipers 151, 152 are in one piece. The wipers 153, 154 are joined together in the same way.

A first spring in the form of a first clamp 161 is joined to the first rotary element 138. The pivot 132 is cylindrical and is fastened in place between two legs of the clamp 161. It is thus attained that the position of the rotary element 138 is equivalent to the position of the driver 8. Thus the first rotary element 138 is a component of the set-point group 24.

A second spring is joined to the second rotary element 140. The second spring has the form of a second clamp 162. The pivot 124 is cylindrical and is fastened in place between legs of the clamp 162. Synchronous slaving of the second rotary element 140 with respect to the adjuster 12 is thus assured. Thus the second rotary element 140 is a component of the actual-value group 26. The switch lug 60 and the switch lug 62 are each connected to one soldered lug via a respective one of the wipers 155 and 156 and a respective one of the wiper paths 145 and 146. The soldered lugs are located on the rotational angle sensor 134. The fourth contact point 94 is secured adjustably to the rotational angle sensor 134 and is electrically connected to another soldered location 164. Via the soldered locations 164, the contact points 91, 92, 93, 94 are joined to the control electronics 66 via the lines 70, 71, 72, which are not shown in FIG. 7.

The switch stop 80 is provided on the pivot 130. As mentioned above, the pivot 130 is a component of the set-point group 24. Depending on the control position of the second rotary element 140 with respect to the substrate material 136, the second current path extending over the contact points 92, 94 will be opened or closed. Depending on the control position of the set-point group 24 relative to the actual-value group 26, the pivot 130 with the switch stop 80 can come to rest on the second switch lug 62, or the switch lug 62 with the contact point 93 can lift away from the contact point 91 of the switch lug 60. Furthermore, depending on the control position of the set-point group 24, and in particular of the switch stop 80 relative to the second rotary element 140, the first current path extending over the contact points 91, 93 is opened or closed.

The exemplary embodiment shown more three-dimensionally in FIG. 7 is approximately equivalent to the first exemplary embodiment shown more schematically in FIG. 1. The exemplary embodiments schematically shown in FIGS. 2–5 can also be three-dimensionally arranged similarly to what has been shown by way of example in FIG. 7.

The rotary element 138 with the wipers 151, 152 and the wiper tracks 141, 142 form the set-point transducer 101 for ascertaining the control position of the set-point group 24. The rotary element 140 having the wipers 153, 154 and the wiper paths 143, 144 together form the actual-value transducer 102 for ascertaining the control position of the actual-value group 26. The set-point transducer 101 and the actual-value transducer 102 in FIG. 7 are two potentiometers; the wiper paths or resistor paths 141, 142, 143, 144 of these potentiometers are advantageously disposed on the same substrate material 136. The result is particularly simple manufacture, and high accuracy can be attained. The wiper paths 145 and 146 are also advantageously located on the same substrate material. It is especially favorable to provide all the wiper paths on the same side of the substrate material 136.

Joining the rotary element 138 to the cylindrical pivot 132 via the clamp 161 has the advantage that no forces can be transmitted transversely to the substrate material 136, that is, in the longitudinal direction of the shaft 126, between the pivot 132 and the rotary element 138. Thus a change in length caused by temperature changes in the shaft 126 (FIG. 6), for instance, has no influence on the pressure between the wipers 151, 152 and the wiper paths 141, 142. The same advantages are attained at the connection between the pivot 124 and the second rotary element 140.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A safety device having an adjuster element and a driver, a control position of the adjuster element being determined as a function of a set point by an actuator means, said adjuster element being provided with two current paths and two relative control regions, a second of said relative control regions of the adjuster element with respect to the driver being ascertained via a state of the first current path, the safety device further including at least one switch lug (60, 62, 108) and a cam means (64) provided on a base member (40), said switch lug (60) being adapted to contact the cam (64) to allow a state of the second current path (70, 72) to vary and a state of the first current path (70, 71) to correspond to a state assumed in the second relative control region of the adjuster element (12) with respect to the driver (8).

2. A safety device for a power control system in a machine, in particular in a vehicle, having a final control element a control position thereof determining a power output of a driving engine, having an adjuster element coupled to the final control element, having an operating element and a driver coupled to the operating element, having an actuator to determine the control position of the adjuster element as a function of a set point, further having two current paths and two relative control regions, a second of said relative control regions of the adjuster element with respect to the driver being ascertained via a state of the first current path, the safety device further including at least one switch lug (60, 62, 108) and a cam (64) provided on a base member (40), said switch lug (60) being adapted to contact the cam (64) to allow a state of the second current path (70, 72) to vary and a state of the first current path (70, 71) to correspond to a state assumed in the second relative control region of the adjuster element (12) with respect to the driver (8).

3. A safety device as defined by claim 1, in which the switch lug (60, 62, 108) is at least indirectly connected to the adjuster element (12).

4. A safety device as defined by claim 2, in which the switch lug (60, 62, 108) is at least indirectly connected to the adjuster element (12).

5. A safety device as defined by claim 1, in which the switch lug (60) is at least indirectly connected to the driver (8).

6. A safety device as defined by claim 2, in which the switch lug (60) is at least indirectly connected to the driver (8).

7. A safety device as defined by claim 1, in which the first current path (70, 71) is opened in the second relative control range of the adjuster element (12) with respect to the driver (8).

8. A safety device as defined by claim 2, in which the first current path (70, 71) is opened in the second relative control range of the adjuster element (12) with respect to the driver (8).

9. A safety device as defined by claim 1, in which the second current path (70, 72) is closed upon contact of the switch lug (6) with the cam (64), the second current path (70, 72) is closed.

10. A safety device as defined by claim 2, in which the second current path (70, 72) is closed upon contact of the switch lug (6) with the cam (64), the second current path (70, 72) is closed.

11. A safety device as defined by claim 1, in which by contact of the switch lug (60) with the cam (64), first the second current path (70, 72) is closed and next the first current path (70, 71) is opened.

12. A safety device as defined by claim 2, in which by contact of the switch lug (60) with the cam (64), first the second current path (70, 72) is closed and next the first current path (70, 71) is opened.

13. A safety device as defined by claim 1, in which a second switch lug (62) is provided at least indirectly on the adjuster element (12), and in the second relative control range of the adjuster element (12) with respect to the driver (8) the second switch lug (62) comes to rest on a switch stop (80) at least indirectly provided on the driver (8), whereupon the second switch lug (62) lifts away from the switch lug (60), and the first current path (70, 71) extending over the two switch lugs (60, 62) is opened.

14. A safety device as defined by claim 2, in which a second switch lug (62) is provided at least indirectly on the adjuster element (12), and in the second relative control range of the adjuster element (12) with respect to the driver (8) the second switch lug (62) comes to rest on a switch stop (80) at least indirectly provided on the driver (8), whereupon the second switch lug (62) lifts away from the switch lug (60), and the first current path (70, 71) extending over the two switch lugs (60, 62) is opened.

15. A safety device as defined by claim 1, in which the second current path (70, 72) extends via two contact points (92, 94), one provided on the cam (64) and one provided on the switch lug (60).

16. A safety device as defined by claim 2, in which the second current path (70, 72) extends via two contact points (92, 94), one provided on the cam (64) and one provided on the switch lug (60).

17. A safety device as defined by claim 2, in which the switch lug (60) comes to rest on the cam (64) when the power output of the driving machine (18) is low.

18. A safety device as defined by claim 2, in which the second relative control range of the adjuster element (12) with respect to the driver (8) occurs whenever the adjuster element (12) deviates relative to the operating element (2) in a direction of a higher power output of the driving engine (18) by more than a predetermined value.

19. A safety device as defined by claim 17, in which the second relative control range of the adjuster element (12) with respect to the driver (8) occurs whenever the adjuster element (12) deviates relative to the operating element (2) in a direction of a higher power output of the driving engine (18) by more than a predetermined value.

20. A safety device as defined by claim 1, in which the cam (64) is adjustable via a set screw.

21. A safety device as defined by claim 2, in which the cam (64) is adjustable via a set screw.

22. A safety device as defined by claim 1, in which in the second relative control range of the adjuster element (!2) with respect to the driver (8), the switch lug (60) comes into contact with a switch stop (112) provided at least indirectly on the adjuster element (12), whereupon the switch lug (60) lifts away from a contact point (93) joined to the driver (8), and the first current path (70, 71) extending via the contact point (93) and via the switch lug (60) is opened.

23. A safety device as defined by claim 2, in which in the second relative control range of the adjuster element (12) with respect to the driver (8), the switch lug (60) comes into contact with a switch stop (112) provided at least indirectly on the adjuster element (12), whereupon the switch lug (60) lifts away from a contact point (93) joined to the driver (8), and the first current path (70, 71) extending via the contact point (93) and via the switch lug (60) is opened.

24. A safety device as defined by claim 2, in which the driving machine (18) is an internal combustion engine with externally supplied ignition, the operating element (2) is an accelerator pedal, and the final control element (16) is a throttle valve.

25. A safety device as defined by claim 2, in which the driving machine (18) is a Diesel engine, the operating element (2) is an accelerator pedal, and the final control element (16) is a governor rod of a Diesel injection pump.

26. A safety device as defined by claim 1, in which a rotational angle sensor (134) is provided with a substrate material (136) with at least one applied wiper track (141, 142, 143, 144, 145, 146) and with at least one rotary element (140) having at least one wiper (151, 152, 153, 154, 155, 156), the at least one switch lug (60, 62) is disposed on the rotary element (140), and the rotary element (140) is joined to the driver (8).

27. A safety device as defined by claim 2, in which a rotational angle sensor (134) is provided with a substrate material (136) with at least one applied wiper track (141, 142, 143, 144, 145, 146) and with at least one rotary element (140) having at least one wiper (151, 152, 153, 154, 155, 156), the at least one switch lug (60, 62) is disposed on the rotary element (140), and the rotary element (140) is joined to the driver (8).

28. A safety device as defined by claim 26, in which the rotational angle sensor (134) includes two rotary elements (138, 140), and at least one wiper path each (141, 142, 143, 144, 145, 146) is provided for each rotary element (138, 140) on the substrate material (136), and the further rotary element (138) is joined to the adjuster element (12).

29. A safety device as defined by claim 27, in which the rotational angle sensor (134) includes two rotary elements (138, 140), and at least one wiper path each (141, 142, 143, 144, 145, 146) is provided for each rotary element (138, 140) on the substrate material (136), and the further rotary element (138) is joined to the adjuster element (12).

30. A safety device as defined by claim 1, in which a rotational angle sensor (134) is provided with a substrate material (136) with at least one applied wiper track (141, 142, 143, 144, 145, 146) and with at least one rotary element (140) having at least one wiper (151, 152, 153, 154, 155, 156), the at least one switch lug (60, 62) is disposed on the rotary element (140), and the rotary element (138) is joined to the adjuster element (12).

31. A safety device as defined by claim 25, in which a rotational angle sensor (134) is provided with a substrate material (136) with at least one applied wiper track (141, 142, 143, 144, 145, 146) and with at least one rotary element (140) having at least one wiper (151, 152, 153, 154, 155, 156), the at least one switch lug (60, 62) is disposed on the rotary element (140), and the rotary element (138) is joined to the adjuster element (12).

32. A safety device as defined by claim 30, in which the rotational angle sensor (134) includes two rotary elements (138, 140), and at least one wiper path each (141, 142, 143, 144, 145, 146) is provided for each rotary element (138, 140) on the substrate material (136), and the further rotary element (140) is joined to the driver (8).

33. A safety device as defined by claim 31, in which the rotational angle sensor (134) includes two rotary elements (138, 140), and at least one wiper path each (141, 142, 143, 144, 145, 146) is provided for each rotary element (138, 140) on the substrate material (136), and the further rotary element (140) is joined to the driver (8).

34. A safety device as defined by claim 26, in which the current paths are carried via the rotary element (140) having the at least one switch lug (60, 62), wherein as a means of electrical connection, two wiper paths (145, 146) are provided on the substrate material (136) and two additional wipers (155, 156) moving along the contact paths are provided on the rotary element.

35. A safety device as defined by claim 27, in which the current paths are carried via the rotary element (140) having the at least one switch lug (60, 62), wherein as a means of electrical connection, two wiper paths (145, 146) are provided on the substrate material (136) and two additional wipers (155, 156) moving along the contact paths are provided on the rotary element.

36. A safety device as defined by claim 2, in which the rotational angle sensor (134) serves as a set-point transducer (101) for detecting a control position of the set-point group (24) and as an actual-value transducer (102) for detecting a control position of the actual-value group (26).

37. A safety device as defined by claim 27, in which the rotational angle sensor (134) serves as a set-point transducer (101) for detecting a control position of the set-point group (24) and as an actual-value transducer (102) for detecting a control position of the actual-value group (26).

* * * * *